United States Patent [19]

Zierl et al.

[11] Patent Number: 4,922,112
[45] Date of Patent: May 1, 1990

[54] APPARATUS FOR DETERMINING THE THICKNESS OF LAYER SUPPORTS

[75] Inventors: Richard Zierl, Eichenau; Erwin Kreuzer, Grafing; Alfred Zuckermayr, Munich, all of Fed. Rep. of Germany

[73] Assignee: Agfa-Gevaert Aktiengesellschaft, Leverkusen, Fed. Rep. of Germany

[21] Appl. No.: 232,117

[22] Filed: Aug. 15, 1988

[30] Foreign Application Priority Data

Aug. 28, 1987 [DE] Fed. Rep. of Germany ....... 3728704

[51] Int. Cl.$^5$ ................................................ G01J 1/00
[52] U.S. Cl. ..................................... 250/372; 250/339; 250/341
[58] Field of Search ......................... 250/372, 339, 341

[56] References Cited

U.S. PATENT DOCUMENTS

| | | | |
|---|---|---|---|
| 3,397,315 | 8/1968 | Johnston | 250/372 |
| 3,869,211 | 3/1975 | Watanabe et al. | 250/560 X |
| 3,956,630 | 5/1976 | Mellows | 250/302 |
| 4,008,388 | 2/1977 | McLafferty | 250/281 |
| 4,105,293 | 8/1978 | Aizenberg et al. | 350/264 |
| 4,199,682 | 4/1980 | Spector et al. | 250/339 |
| 4,511,800 | 4/1985 | Harbeke et al. | 250/372 |
| 4,549,079 | 10/1985 | Terasaka et al. | 250/339 |
| 4,766,315 | 8/1988 | Hellstrom et al. | 250/341 |

FOREIGN PATENT DOCUMENTS 0211654 2/1987 European Pat. Off. .
2077426 12/1983 United Kingdom .

*Primary Examiner*—Constantine Hannaher
*Assistant Examiner*—J. Eisenberg
*Attorney, Agent, or Firm*—Connolly and Hutz

[57] ABSTRACT

Figure 1:
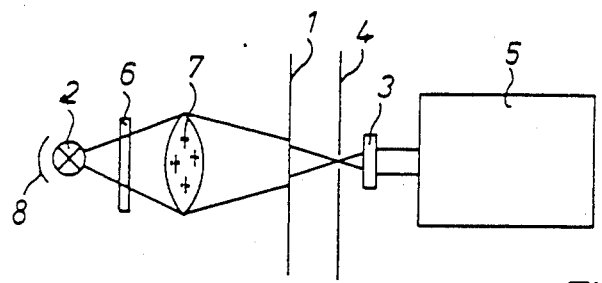

An apparatus for on-line measurement of the layer thicknesses of moving flexible layer supports over the whole width of the web by photoelectric means is described. A light source (2) which emits UV light passes a beam of parallel or slightly converging rays through the layer support (1), the transmitted light is registered by a photoelectric receiver (3) which is sensitive to UV light and the registered signal is transmitted to an electronic interpretation mechanism (5) from which the layer thickness is determined and recorded on-line once calibration has been carried out (FIG. 1).

6 Claims, 3 Drawing Sheets

APPARATUS FOR DETERMINING THE THICKNESS OF LAYER SUPPORTS

This invention relates to an apparatus for determining the thickness of layer supports which are preferably in the form of webs by optoelectronic means.

The layers supports preferably used for the production of photographic materials or magnetic recording carriers are flexible films, for example of cellulose triacetate or polyethylene terephthalate. It is necessary to check the web of film both for its thickness and for the evenness and other properties of its surface both before and after coating since, as is well known, variations in thickness and surface faults have a considerable effect both on the recording quality and on the reproduction quality of the recording carriers. These checks are normally carried out as spot checks, for example by mechanical methods for measuring the layer thickness and by interference optical methods for testing the surface According to DE-OS 2 724 919, 2 909 400 2 935 716, 3 149 709 and 3 248 157, infra-red light is used for measuring the thickness of layers, either by transmission or reflection or interference measurements. Polarized infra-red light is proposed in DE 16 23 196. An interferometer arrangement is used as measuring method in DE 31 36 887. In DE 29 07 620, it is proposed to add a fluorescent substance to the layer to be measured and then to measure the fluorescent light as a measure of the layer thickness. In DE- 23 33 326 the measuring light is split up into several light beams which pass through a film so that thickness measurements can be carried out at several points Laser light is proposed for measuring the thickness in DE 23 55 185 and EP 0 211 654. In DE 23 55 185, the laser beam is first directed perpendicularly on to a reference plane and then perpendicularly on to the object to be measured and the difference in the results is used as a measure of the thickness of the layer. In EP 0 211 654, the thickness of the layer is determined by passing the film to be measured over a roll which is arranged opposite an edge to form a gap which is used as a measure of the layer thickness. DE 22 54 910 describes how a long term drift of the measuring arrangement can be avoided by sub-dividing the measuring light and using part of the light as comparison beam to eliminate fluctuations in light. The use of modulated light for measuring layer thicknesses is disclosed in DE 29 28 997.

US 3 956 630 describes a process for measuring the layer applied to a paper web by adding a fluorescent substance to the coating compound, illuminating the web with UV light and then measuring the diffusely reflected fluorescent light. A similar arrangement but without fluorescent substance is described in DE-GM 82 02 548.

The measuring arrangements described above are unsuitable for on-line measurements of webs of film which are rolled up and unrolled at high speed in a casting apparatus while in other cases they are too complicated or insufficiently accurate. The problem therefore existed of providing a measuring apparatus which would be suitable for measuring the layer thickness of flexible layer supports and which would carry out on-line measurements of the thickness and variations in thickness of a moving layer support,
supply measuring results over the whole width of the web of layer support,
have sufficiently small measuring areas to detect faults covering only a small area,
would at the same time record the measuring results so that a fault could be localized and
would give constant results even over long periods of measurement.

The invention has solved this problem by means of an apparatus having the features given in the characterizing part of claim 1. Further details of the invention appear in the sub-claims, the description and the drawings.

Figure 2:
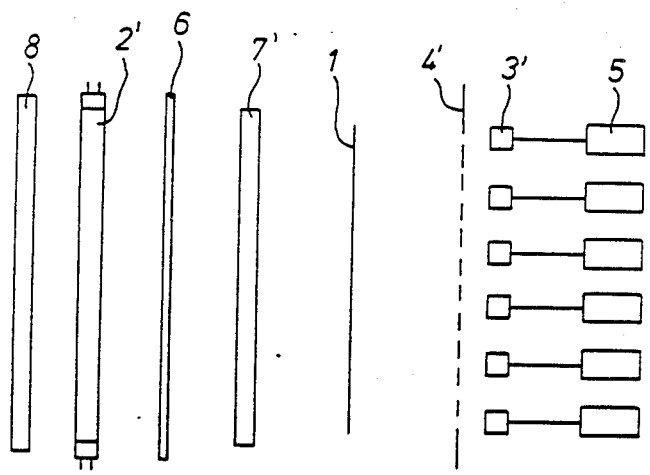
Figure 3:
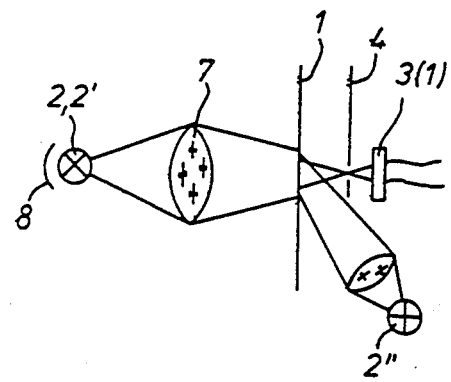
Figure 4:
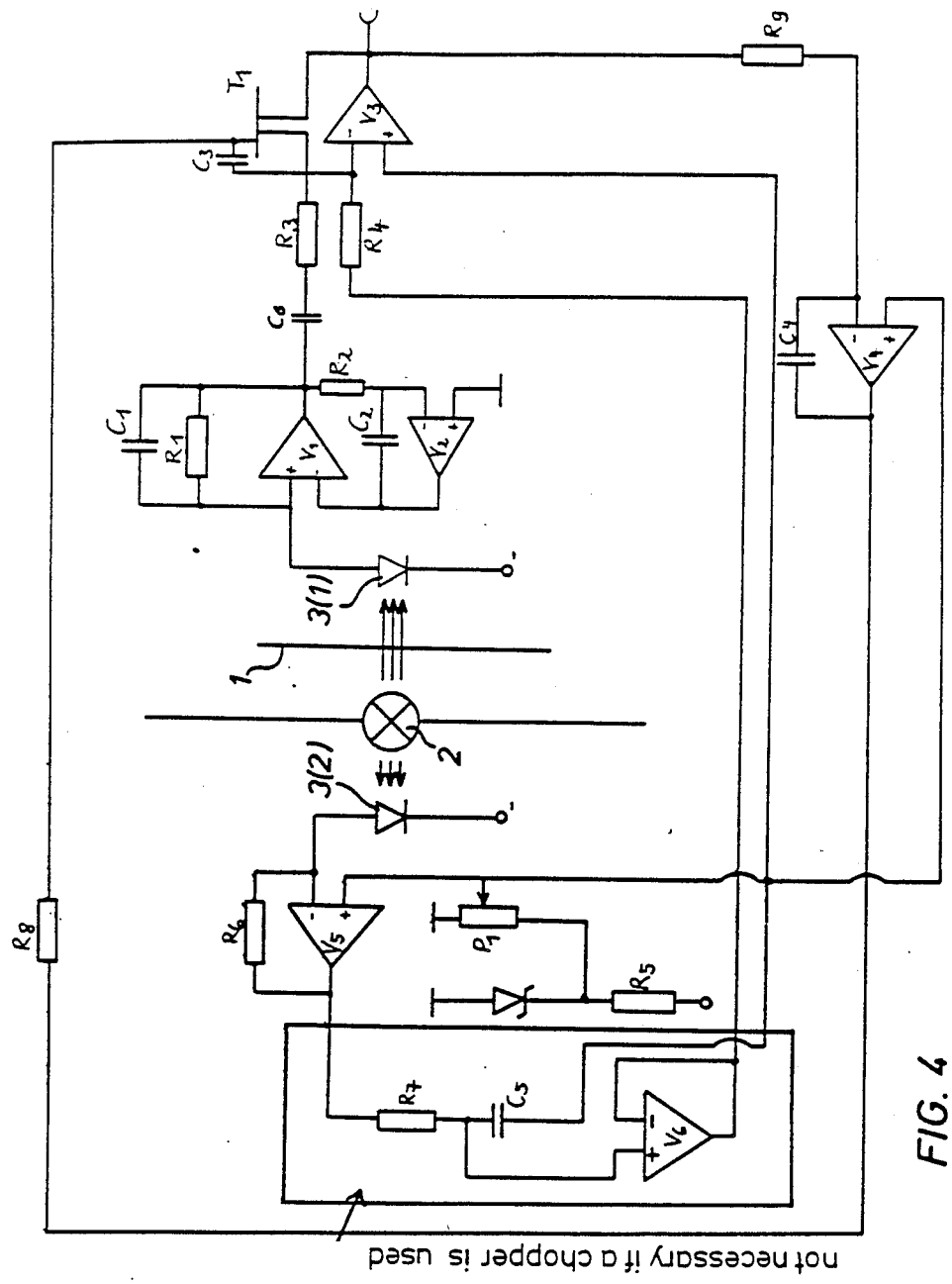
Figure 5:
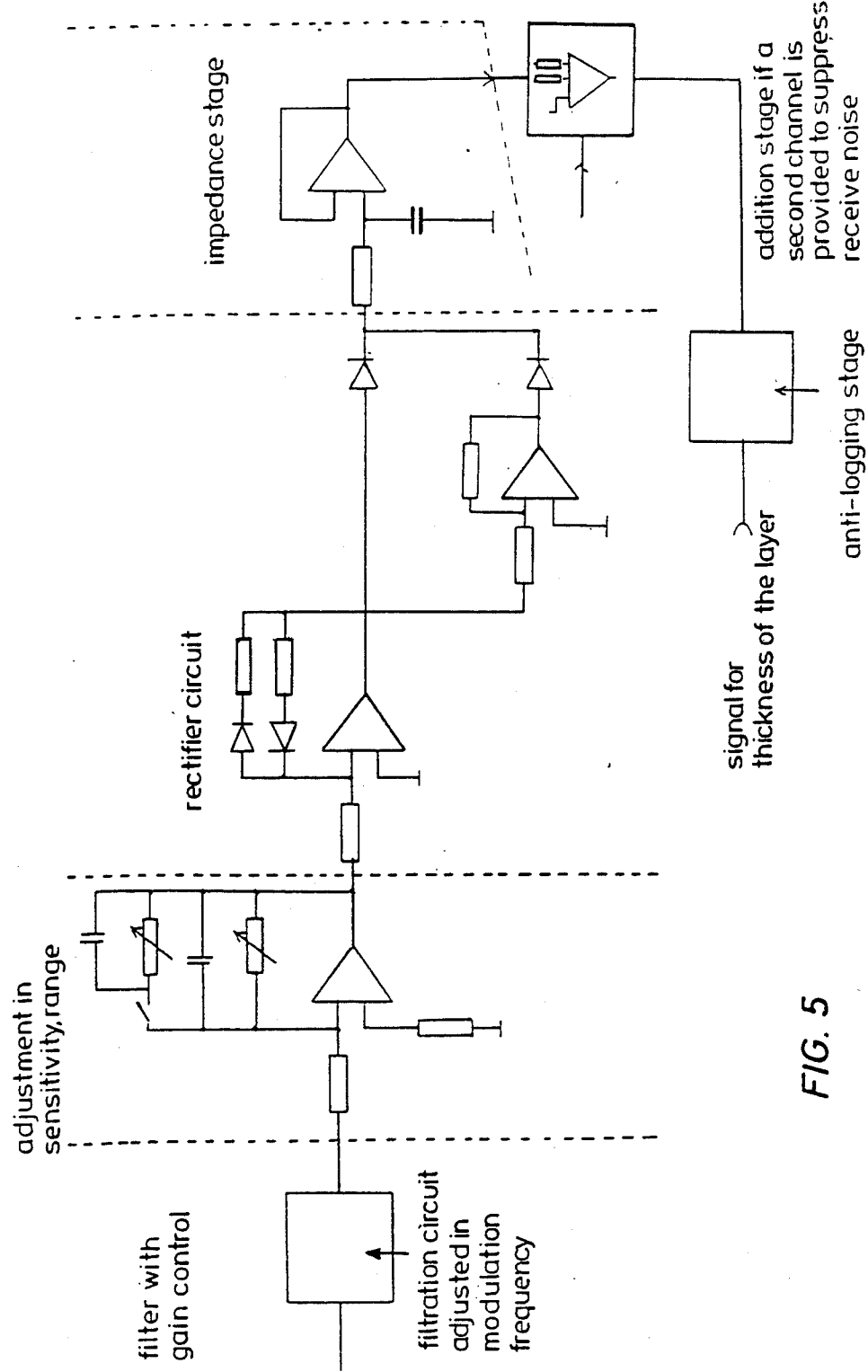

The invention will now be explained in more detail with reference to the drawings in which FIG. 1 is a schematic representation of the apparatus according to the invention, FIGS. 2-3 show variations of the apparatus according to the invention, FIG. 4 is an overall circuit diagram of the interpretation electronics according to the invention for zero point control and gain control, and FIG. 5 is an overall circuit diagram of the stages of signal processing.

The layer supports used for magnetic and photographic purposes, such as polyethylene terephthalate, are normally transparent in the visible range of wavelengths but show heavy absorption in the UV range, especially at wavelengths below 300 nanometers. It has now been found that a reliable measurement of layer thicknesses can be obtained by using light in this wavelength region. The transmitted light should lie at least partly in this wavelength region for which the layer support is highly absorptive and the light is registered by a photoelectric receiver which is sensitive in this wavelength region and converts the light into an electric signal which gives an absolute measure of the layer thickness once the apparatus has been calibrated. The measurements are preferably carried out on-line over the whole width of the web of layer support.

1. Optical arrangement

The following may be used as sources of light:
Laser light producing radiation in the UV range either directly or by multiplication of frequency, or
discharge lamps with proportions of their radiation lying in the UV range of 300 nanometer or shorter.

When these sources of light are used, filters should be employed to filter out the radiation components of longer wavelengths.

As shown in FIG. 1, the rays of light issuing from the light source (2) are passed through a condenser (7) so that they leave as parallel or slightly convergent rays to pass through the layer support (1). The transmitted light is collected by a photoelectric receiver (3), for example a silicon photoelectric diode or a SEM. The corresponding current signal or voltage signal is transmitted to an electronic interpreting device (5) which will be described hereinafter. An optical filter which will only transmit UV light may be arranged in front of the receiver (3), for example to eliminate light from the surroundings. In addition, a perforated screen (4) is situated in front of the receiver so that, regardless of any minor alterations in distance between the layer support (1) and the photoelectric receiver (3), only parts of the homogeneously illuminated measuring area of the layer support, which emits almost perfectly diffuse light from the side remote from the source of light, are seen by the photoelectric receiver and fluctuations in the distance of the layer support do not enter into the measurement. When discharge lamps are used, a filter (6) which will only transmit UV light in the above-mentioned wavelength range is placed between the source of light and condenser.

Since it is the preferred object of this arrangement to carry out on-line measurement of the layer thickness over the whole width of a web of layer support moving through a casting apparatus, it is suitable to provide either individual arrangements of point sources of light and receivers or a source of light in the form of a low pressure mercury vapor discharge tube, for example a germicidal and ozone emitter (HNS radiator) (2') which extends transversely to the direction of the web (FIG. 2) so that the whole width of the web is exposed to this lamp either from above or from below. The light may be directed as parallel or convergent rays to the web by passing it through reflectors (8) and centric lenses (7') or, if the source of light is tubular, through reflectors or cylindrical lenses, so that the layer support can be illuminated over the whole width of the web. The luminous flux passing through the support is received by a plurality of photoelectric receivers (3') which are arranged on the opposite side of the layer support. The number of photoelectric receivers determines the density of scanning, which can be increased until the entire width of the web of layer support is covered without any gap.

The signal measured at the receiver (3) may be used to determine the layer thickness on the basis of the following mathematical considerations:

The transparency of a material is defined as layer support $0a$  $0d$ $$T = \frac{\text{transmitted light flux } 0d}{\text{incident light flux } 0a}$$

Density $D = \log \frac{1}{T} \sim \log$ layer thickness $d$ $$\frac{1}{0d} = \frac{1}{T \cdot 0a}$$

$$\log \frac{1}{0d} = \log \frac{1}{T} + \log \frac{1}{0a} = D + \log \frac{1}{0a}$$

$$\log \frac{1}{0d} = x \cdot \log d + \log \frac{1}{0a}$$

The antilogged signal is therefore inversely proportional to the film thickness d to be measured.

The source of light may be a Xenon lamp 150 W or 250 W, for example, XBO 250. These lamps may be operated by modulated direct current to produce frequency modulated light. If types of lamps are used (for example, mercury high pressure lamps) whose light flux cannot be modulated by the supply current, then the light must be modulated mechanically, for example by means of a rotatable perforated shutter.

Frequency modulated light is necessary to enable the modulated wavelengths to be filtered out so that the electronic part receives only the wanted signal and no interference components.

The modulation frequency to be selected depends on the speed of transport of film in on-line operation and the expected degree of local resolution in the direction of transport. When discharge lamps which cannot be operated by direct voltage are used, the modulation frequency is the supply frequency. If a suitable generator current is used, this supply frequency may be chosen to be higher than 50 Hz. The local resolution in the direction of transport of the layer support depends on the magnitude of the area to be scanned, the speed and the modulation frequency.

2. Description of the function of the electronic part

Interpretation of the signal produced in the receiver (3) is carried out by the circuit shown in FIG. 4.

The photoelectric receiver 3(1) (either a UV-sensitive silicon element or a UV-sensitive photoelectric multiplier) feeds its current signal, which is proportional to the light passing through the test sample, into the input amplifier V1.

The circuit diagram of FIG. 4 applies to the use of a photoelectric diode. When a multiplier is used it is necessary to carry out a voltage-current conversion to enable the circuit described to be employed.

2.1 Zero point control

The input amplifier V1 and the integration amplifier V2 together constitute a zero point control element. This means that the output voltage of V1 is kept at zero regardless of the quiescent current through 3(1). This is achieved as follows: when the output voltage of V1 deviates from zero, the output voltage of V2 continuously changes until the voltage difference between the two inputs of V1 tends towards zero. The output voltage of V1 is then also zero and the process of integration is completed. The adjusted state is stable since the integration voltage V2 is immediately readjusted by the slightest drifting of the output V1 away from zero. R2 and C2 form the integration time constants. These are to be so chosen that the modulation frequency is completely transmitted.

2.2 Adjustment of the operating point of the photoelectric receiver 3(1)

In order to obtain linear operation of the receiver in the region of the amplitude of the modulation signal and of the superimposed measuring signal it is necessary to place the operating point in the linear part of the light flux/receiver current graph. If the layer support is optically very dense the transmitted light source (2) must transmit a light flux of high intensity in order that the level of constant light which carries the modulation may be obtained for the adjustment of the operating point of the photoelectric receiver 3(1). This may give rise to problems due to unacceptable heating up of the layer support (1). This problem may be avoided by the arrangement shown in FIG. 3, in which a source of constant light (2") is so arranged on the side of the receiver opposite to the source of light (2) that the light emitted by this constant source (2") illuminates the layer support (1) and the light reflected or scattered back from the support mixes with the light from the light source (2.2') which is transmitted through the support and the mixed light reaches the photoelectric receiver(s) 3(1). If it is geometrically possible, the source of light (2") may, of course, also illuminate the photoelectric receiver 3(1) directly. The intensity of the source of constant light (2") is adjusted so that the photoelectric receiver (3(1) operates in the linear region. This enables the intensity of the source of light (2.2') to be considerably reduced. Since the source of light (2") emits constant light, the filtration of modulated light (2.2') already described above ensures that only the wanted signal is obtained in the electronic part.

2.3 Gain control

V3 and the field effect transistor T1 together form a further control stage. In this arrangement, the transistor which is used as controllable feedback resistor is used to equal out fluctuations in light from the light source by changes in gain.

Part of the light flux produced by the lamp is transmitted to the receiver 3(2). The operating point of V5 is adjusted by the potentiometer P1. When the lamp is burnt in, the output of V5 should be adjusted to 0 V. The voltage of the operating point (through P1) also lies at the non-inverting input of V3. The input voltage at the inverting input of V3 over R4 is the output voltage of V5 (initial state 0 V).

When the flux from the lamp is modulated, the modulation voltage is symmetrically superimposed on this output voltage. Since only the direct voltage component is required as control factor for further operation, the alternating voltage component is eliminated by the integration element R7, C5. V6 forms an impedance stage to bring the signal at a low ohmic value to R4 V3. The operating voltage adjusted by P1 also lies at the noninverting input of V4. The output voltage of the integration amplifier V4 will continue to adjust itself until it has pushed the output voltage of V3 forwards to such an extent by means of the transistor T1 which is used as a variable resistor that the two difference inputs of V4 are both at the same voltage. This means that the output direct voltage of V3 is equal to the voltage of the operating point.

If the photoelectric current of 3(2) now changes due to a change in the luminous flux, then the output voltage of V5 changes and becomes different from zero. The output voltage of V3 would alter by the same amount but with reverse sign if the amplification of V3 had not been equalized by T1 by means of the integration amplifier V4 so that the output direct voltage of V3 always corresponds to the output voltage of V5 and the voltage of the operating point. The change in gain of V3 thus compensates for the change in luminous flux from the lamp. Since the amplification stage V3 is also used for the useful signal of alternating voltage by way of the additional resistor R3, the useful signal is independent of the flux from the lamp within the limits in which the circuit operates. In this arrangement, R3 must be equal to R4.

In the following filtration circuit, the signal is selectively amplified as shown in FIG. 5 (active filter). In the adjacent amplifier, adjustments in sensitivity or in range may be carried out by way of variable or switch controlled feedback resistors. The alternating voltage signal is then rectified in a rectifier circuit which is also suitable for low voltages. The next following impedance stage converts the signal which is at a high ohmic value after it has been smoothed into a low ohmic output signal. An addition stage following this impedance stage is only necessary if a completely equivalent second channel with a darkened second photoelectric receiver directly adjacent to the first photoelectric receiver is provided to suppress the photoelectric receiver noise. The signal from this channel phase-rotated through 180°, is added to the first signal in the addition stage. The signal to noise ratio may also be significantly improved by using a phase-synchronous selective amplifier (lock-in amplifier) in the input stage. These two measures are not shown in FIGS. 4 and 5. An anti-logging stage is used as the last signal processing stage.

The signal now obtained is a relative measure of the thickness of the layer support d. Once the apparatus has been calibrated, layer thicknesses can be continuously measured in absolute units. The results obtained may be recorded on a X-Y-t recorder to provide a continuous test certificate.

Since all the elements used are available on the market at low cost, this method provides a rational method of on-line measurement of layer thicknesses which will also reliably measure slight variations in thickness.

We claim:

1. Apparatus for on-line measurement of the layer thickness of layer supports by transmitted light using optoelectronic means, in which the layer support (1) moves in relation to the apparatus and the light source (2) emits modulated light, the photoelectric receiver (3) preferably being a diode which records the transmitted light and an electronic evaluation mechanism (5) comprising means for amplifying to keep the amplifier output voltage at zero, and thereby determining the layer thickness of the layer support from the recorded signal from the photoelectric receiver, characterized on that
    the source of light (2) emits UV light in a range of wavelengths in at least a part of which the layer support has a high absorption,
    the source of light illuminates the layer support with parallel or slightly convergent light,
    at least one perforated screen (4) is arranged between the layer support and the photoelectric receiver in such a manner that when there is a slight change in the distance between the layer support and the photoelectric receiver the latter always records the same quantity of light,
    a zero point controlled voltage convertor circuit in the electronic evaluation mechanism (5) converts the current signal produced in the receiver (3) into a voltage signal which is subsequently amplified by a voltage amplifier, and an electronic filter frees the amplified signal from the modulation frequency and the signal is then rectified by a rectifier and optionally antilogged by a further electronic stage.

2. Apparatus according to claim 1, characterized in that the layer support consists of polyethylene terephthalate and the light passing through it lies in the wavelength region below 360 nm, preferably below 300 nm.

3. Apparatus according to claim 1, characterized in that the source of light is a tubular discharge lamp which is arranged perpendicular to the direction of movement of the layer support and parallel to the plane of the layer support and in that several photoelectric receivers are arranged parallel to the discharge lamp on the far side of the layer support.

4. Apparatus according to claims 1, 2 or 3, characterized in that light emitted from the source of light (2) is modulated by electric optical or mechanical means with a frequency of 0.05 to 25 kHz.

5. Apparatus according to claims 1, 2 or 3, characterized in that the current signal produced in the receiver 3(1) is fed into an input amplifier V1 which together with an integration amplifier V2 forms a zero point control element.

6. Apparatus according to claims 1, 2 or 3, characterized in that part of the light emitted from the source of light is conducted to a second photoelectric receiver 3(2), the current signal is fed into an amplifier V5, the outgoing signal is freed from the modulation alternating voltage in a R-C member and the resulting signal produces a change in amplification in an amplifier V3 by means of a transistor which is usable as feedback resistor.

* * * * *